United States Patent
Mokhtari et al.

(10) Patent No.: US 10,606,296 B2
(45) Date of Patent: Mar. 31, 2020

(54) CLOUD-BASED MICROGRID CONTROL

(71) Applicant: Open Access Technology International, Inc., Minneapolis, MN (US)

(72) Inventors: Sasan Mokhtari, Eden Prairie, MN (US); Khashayar Nodehi Fard Haghighi, Maple Grove, MN (US); Erik Amundson, Rogers, MN (US); David D. Heim, Minneapolis, MN (US); Naveen Ranganath, Plymouth, MN (US); Dean Eriksson, Brooklyn Park, MN (US); Long Duong, Maple Grove, MN (US); Damian Cieslicki, Los Altos, CA (US); Ebrahim Vaahedi, West Vancouver (CA)

(73) Assignee: OPEN ACCESS TECHNOLOGY INTERNATIONAL, INC., Minneapolis, MN (US)

( * ) Notice: Subject to any disclaimer, the term of this patent is extended or adjusted under 35 U.S.C. 154(b) by 311 days.

(21) Appl. No.: 14/660,312

(22) Filed: Mar. 17, 2015

(65) Prior Publication Data
US 2015/0261240 A1 Sep. 17, 2015

Related U.S. Application Data (60) Provisional application No. 61/954,359, filed on Mar. 17, 2014.

(51) Int. Cl.
*G05F 1/66* (2006.01)
*H02J 3/38* (2006.01)
(Continued)

(52) U.S. Cl.
CPC ............. *G05F 1/66* (2013.01); *H02J 3/381* (2013.01); *H02J 3/48* (2013.01); *G05B 15/02* (2013.01);
(Continued)

(58) Field of Classification Search
CPC ........ G05F 1/66; G05F 14/5009; G05B 15/02; H04L 9/3247
(Continued)

(56) References Cited

U.S. PATENT DOCUMENTS

| | | | | |
|---|---|---|---|---|
| 8,731,724 B2* | 5/2014 | Drees | ..................... | G05B 15/02 700/276 |
| 2011/0282507 A1* | 11/2011 | Oudalov | .................. | H04B 3/54 700/292 |

(Continued)

*Primary Examiner* — Michael Rutland Fin
(74) *Attorney, Agent, or Firm* — Vidas Arrett & Steinkraus P.A.

(57) ABSTRACT

A method and system of optimizing microgrid operations is provided. One or more intelligent microgrid coordinators interface with the microgrid such that those microgrid coordinators are able to measure and control all microgrid asset activities. The microgrid coordinator is used to forecast the microgrid's demanded load more accurately, and assign asset commands so as to optimize microgrid consumption, generation, and storage of load. The method and system incorporate a valuation of dispatchable load in optimization functions. The microgrid coordinator is further used to protect the microgrid assets from over-current situations when the microgrid is connected to the bulk electric system and when islanded. The method and system provide a means to test the microgrid controller prior to implementation on the microgrid in order to assure proper operation.

2 Claims, 5 Drawing Sheets

(51) Int. Cl.
  *H02J 3/48*  (2006.01)
  *H02J 3/00*  (2006.01)
  *H04L 9/32*  (2006.01)
  *G05B 15/02* (2006.01)

(52) U.S. Cl.
  CPC ....... *H02J 2003/003* (2013.01); *H04L 9/3247* (2013.01)

(58) Field of Classification Search
  USPC .................................. 700/295, 291; 703/18
  See application file for complete search history.

(56) References Cited

U.S. PATENT DOCUMENTS

| | | | | |
|---|---|---|---|---|
| 2013/0345888 A1* | 12/2013 | Forbes, Jr. | ............ | G05B 15/02 700/291 |
| 2016/0147244 A1* | 5/2016 | Momoh | .................... | G05F 1/66 700/297 |
| 2016/0233682 A1* | 8/2016 | Do Rosario | ............ | H02J 3/387 |

* cited by examiner

CLOUD-BASED MICROGRID CONTROL

CROSS-REFERENCE TO RELATED APPLICATIONS

This application claims priority to U.S. Provisional patent application No. 61/954,359 filed Mar. 17, 2014, the entire content of which is hereby incorporated by reference.

STATEMENT REGARDING FEDERALLY SPONSORED RESEARCH

Not Applicable.

FIELD OF THE INVENTION

The present disclosure relates generally to power grids and, in particular, to systems and methods for managing microgrids. More particularly, to systems and methods for improving local control of generation and consumption assets of microgrids.

BACKGROUND OF THE INVENTION

Microgrids are providing a growing percentage of the electric power consumed by electronic devices located on and away from microgrid locations. As more microgrids are connected with the bulk electric system (BES), the complications of microgrid control for both operators of the BES and of microgrids become more evident.

Although the concept of a microgrid has been known within the electrical utility industry for many years as a small scale electricity system, recent advances in material sciences and information technology, among others, have facilitated improved techniques and methodologies making microgrid installations more reliable, practical, and attractive for an increasing segment of electrical loads. The benefits of microgid installations are also well known in the industry. Generation sources within a typical microgrid are frequently from renewable resources and suffer less distribution system loss traveling much shorter distance from source to load. Microgrids also allow more user control over electricity consumption and creation, allowing increased security and reliability for some microgrid users as well as independence from traditional utilizes.

As interest and availability of microgrids increase, so too does their impact on the BES. While the typical microgrid covers a smaller area with a small number of power generation sources and loads, such as a single office building load serviced by generation from a small number of wind turbines, photovoltaics and traditional generation sources, the size varies greatly and can include any number of generation and load assets. Many such microgrids are connected to and, to some degree, dependent upon connection with the bulk electrical system for reliability, creating a "back-and-forth," transactional relationship with local utilities and energy markets.

Many microgrids utilize some form of a master controller to facilitate data acquisition and perform monitoring and supervisory control over the operation of a microgrid during all microgrid operating modes (grid-connected, islanded, and transition between the two). In the current state of the art, master controllers have monitored the prevailing operating conditions of a microgrid and initiated pre-programmed, remedial actions if the system is not operating within acceptable limits (e.g. voltage and frequency violations). Microgrid master controllers have been designed with functionality to dispatch local resources to minimize the overall cost of meeting microgrid load by balancing generation and load reactively or in near-real time in order to reduce the purchase of electricity supply from the BES.

The size and complexity of microgrid installations utilizing many generation sources to fulfill demand within the microgrid, in whole or part, creates challenges for both the microgrid operator as well as any utilities that would like to anticipate demand from one or multiple microgrid installations as well as economically utilize any excess generation.

Historically, the ability to forecast demand within a microgrid and effectively balance generation to meet predicted, local load demands has been inaccurate and unreliable. Some microgrids have relied primarily on producing additional generation to ensure reliability. Without methods for accurately forecasting demand within a local system, excess generation created by such a microgrid must be stored or reintroduced to the BES. This too has caused additional issues for utilities that must identify load entering the BES and find methods to economically utilize that additional generation in a manner which does not violate strict reliability regulations. Moreover, such generation can be expensive to both purchase and utilize for utilities, while syncing excess generation for distribution to the BES can be difficult and unreliable for microgrid system operators as well.

Further, the ability to optimize microgrid activities has been hindered by the lack of a reliable valuation of dispatchable load. Without this valuation, microgrid managers do not have a clear conception of the true cost of the "generation" (by means of load shedding) employed to provide the microgrid's demanded load. Thus, unseen costs associated with shedding dispatchable load counteract the economic benefits of shedding that load in lieu of increasing generation or purchasing electricity from the BES. This decreases the usefulness of microgrid optimization activities, as these unseen costs may outweigh the apparent financial benefit of load shedding in certain situations.

BRIEF SUMMARY OF THE INVENTION

In general, this disclosure is directed toward systems and methods for optimizing the communications, calculations, commands, and design of microgrids and the assets and coordinating devices installed therein.

Using the systems and methods described in this disclosure, microgrids can be developed and managed in a way that (1) simulates and tests the functions of a microgrid and microgrid coordinator, (2) increases accuracy of load forecasting both when connected to and isolated from the BES, (3) detects and clears faults during over-current protection both when connected to and isolated from the BES, (4) prevents variable generation resources from seizing during low-voltage situations, (5) optimizes the sourcing of microgrid electricity, (6) prevents false data from impacting microgrid operation, and (7) accurately calculates the cost of dispatchable load.

In one embodiment of the invention, at least one intelligent microgrid-coordinator device is installed on the microgrid premises. This microgrid coordinator contains the software necessary to keep a record of all load-consuming assets and load-generation resources on the microgrid. This microgrid coordinator may be used to categorize load-consuming assets into multiple types in order to increase the accuracy of load forecasting. Further, the value of dispatchable load is determined when planning involvement in DR events and microgrid optimization. Information on load-generation resources may be stored on the microgrid coordinator and used in optimization functions to determine the optimal percentage of load to be delivered from microgrid load-generation resources as opposed to from the BES. Variable load-generation resources are equipped with protection hardware to prevent them from ceasing to operate during low-voltage situations, increasing the safety of the microgrid and its connection to the BES. In order to protect from over-current faults when connected to and isolated from the BES, the microgrid coordinator is able to detect and clear faults at both BES fault-current levels and microgrid fault-current levels, and isolates the faulting portion of the microgrid accordingly. The microgrid coordinator may be used to aggregate all communications to and from the microgrid, and authenticates all communications from external sources. In this way, no false data is able to affect microgrid functions. In this embodiment, this combination of sophisticated components cannot be safely tested in the actual operating environment. Thus, the system includes a test simulator to simulate the microgrid and microgrid coordinator such that all functions may be safely tested before operating-environment execution.

The invention may take the form of a system for managing a microgrid, configured to:
1) Optimize the forecast of load demanded by the microgrid,
2) Optimize the procurement of load consumed by the microgrid, and
3) Protect microgrid assets from over-current situations.

The invention may also include a method to optimize microgrid operations by:
1) Optimizing the forecast of load demanded by the microgrid,
2) Ensuring the microgrid is obtaining load demanded by the microgrid in the most economically optimal fashion, and
3 Protecting microgrid assets from over-current situations.

The details of one or more aspects of the disclosure are set forth in the accompanying drawings and the description below. Other features, objects, and advantages will be apparent from the description and drawings, and from the claims.

DETAILED DESCRIPTION OF THE INVENTION

While this invention may be embodied in many forms, there are specific embodiments of the invention described in detail herein. This description is an exemplification of the principles of the invention and is not intended to limit the invention to the particular embodiments illustrated.

For the purposes of this disclosure, like reference numerals in the figures shall refer to like features unless otherwise indicated.

In general, this disclosure is directed toward systems and methods for managing microgrid operations. The disclosure proposes installing at least one intelligent microgrid coordinator on a microgrid site. This microgrid coordinator aggregates communications to and from the microgrid, and contains intelligent software capable of managing microgrid operations in more sophisticated a manner than has previously been applied in any single microgrid management solution.

Figure 1:
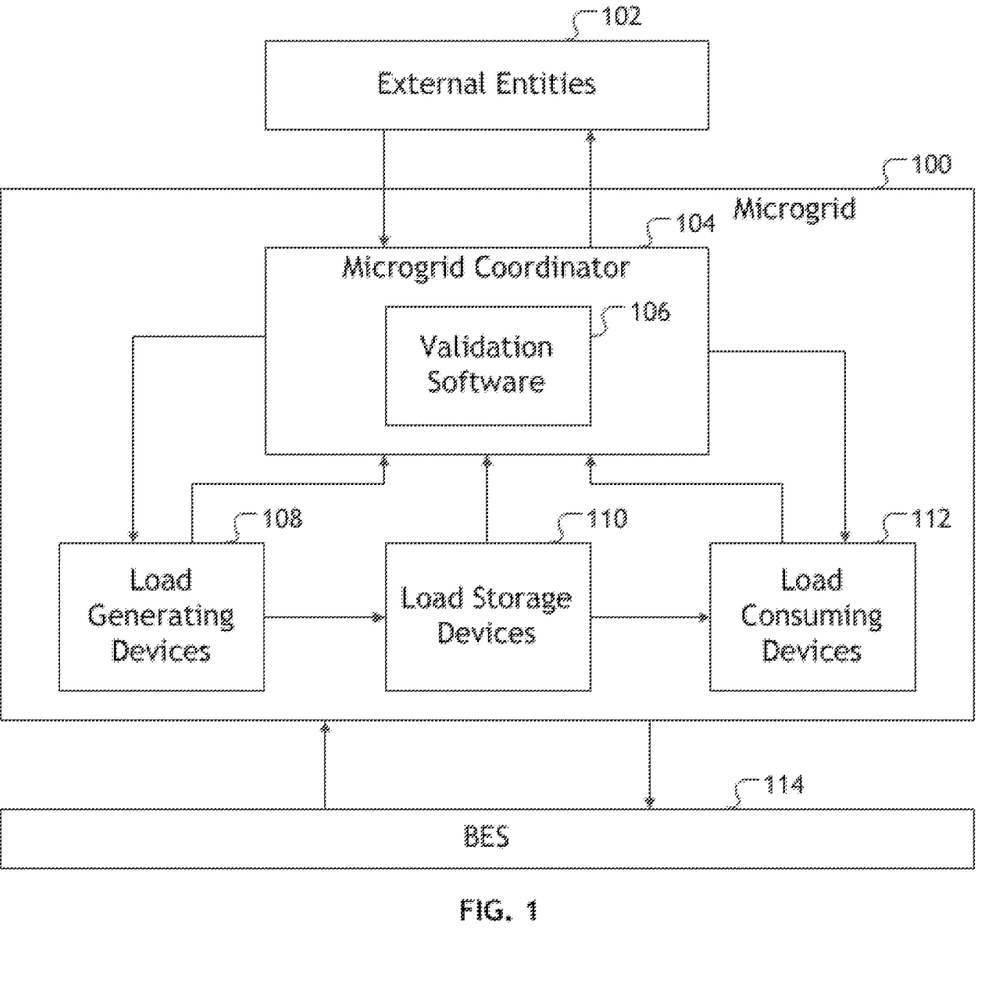
FIG. 1 is a diagram illustrating a potential example of how the components of the systems and methods may interact.

Referring to FIG. 1, which is a diagram illustrating a potential example of how the components of the systems and methods may interact, Microgrid 100 is connected to the BES 114 through any communications interface known in the art. Communications from External Entities 102 connect to Microgrid 100 through Microgrid Coordinator 104. In this embodiment Microgrid Coordinator 104 is located on the same premises as Microgrid 100, but in other embodiments it may be located remotely. Further, while only one Microgrid Coordinator 104 is illustrated here, in some embodiments multiple Microgrid Coordinators 104 may be installed for redundancy purposes. Microgrid Coordinator 104 passes all communications received from External Entities 102 through Validation Software 106, shown here as located within Microgrid Coordinator 104. Validation Software 106 validates the propriety of all communications it receives to determine that the communications originated from known, reputable sources. Validation Software 106 may be any type of software known in the art that performs data validation. This will often be performed via public key infrastructure certification but may also analyze communications themselves in addition to the signatures attached thereto. For example, Validation Software 106 may ensure that all microgrid commands contained in received communications have all necessary data and pass microgrid constraints, such as checking for voltage, frequency, or minimum load violations resulting from dispatch commands. These constraints could be established by utilities or microgrid owners.

If communications are approved by Validation Software 106, they are sent by Microgrid Coordinator 104 to the corresponding assets in the microgrid by any communication protocol known in the art. Load Generating Devices 108, Load Storage Devices 110, and Load Consuming Devices 112 are examples of assets to which communications may be passed. These communications will typically be usage commands such as "turn on," "turn off," "ramp up," "ramp down," and "deliver load to," among others. Microgrid Coordinator 104 may also accept communications from Load Generating Devices 108, Load Storage Devices 110, and Load Consuming Devices 112. These communications will typically be instantaneous asset properties, such as "amount of load being generated," "amount of load stored," "amount of load being consumed," and various other status messages.

Load Generating Devices 108 may deliver generated load within Microgrid 100 to either Load Storage Devices 110 or Load Consuming Devices 112. Load Storage Devices 110 may deliver stored load to Load Consuming Devices 112. Microgrid 100 may transmit load to BES 114 as it is being generated by Load Generating Devices 108, from Load Storage Devices 110, or from Load-Consuming Devices 112 in the form of dispatched load.

Figure 2:
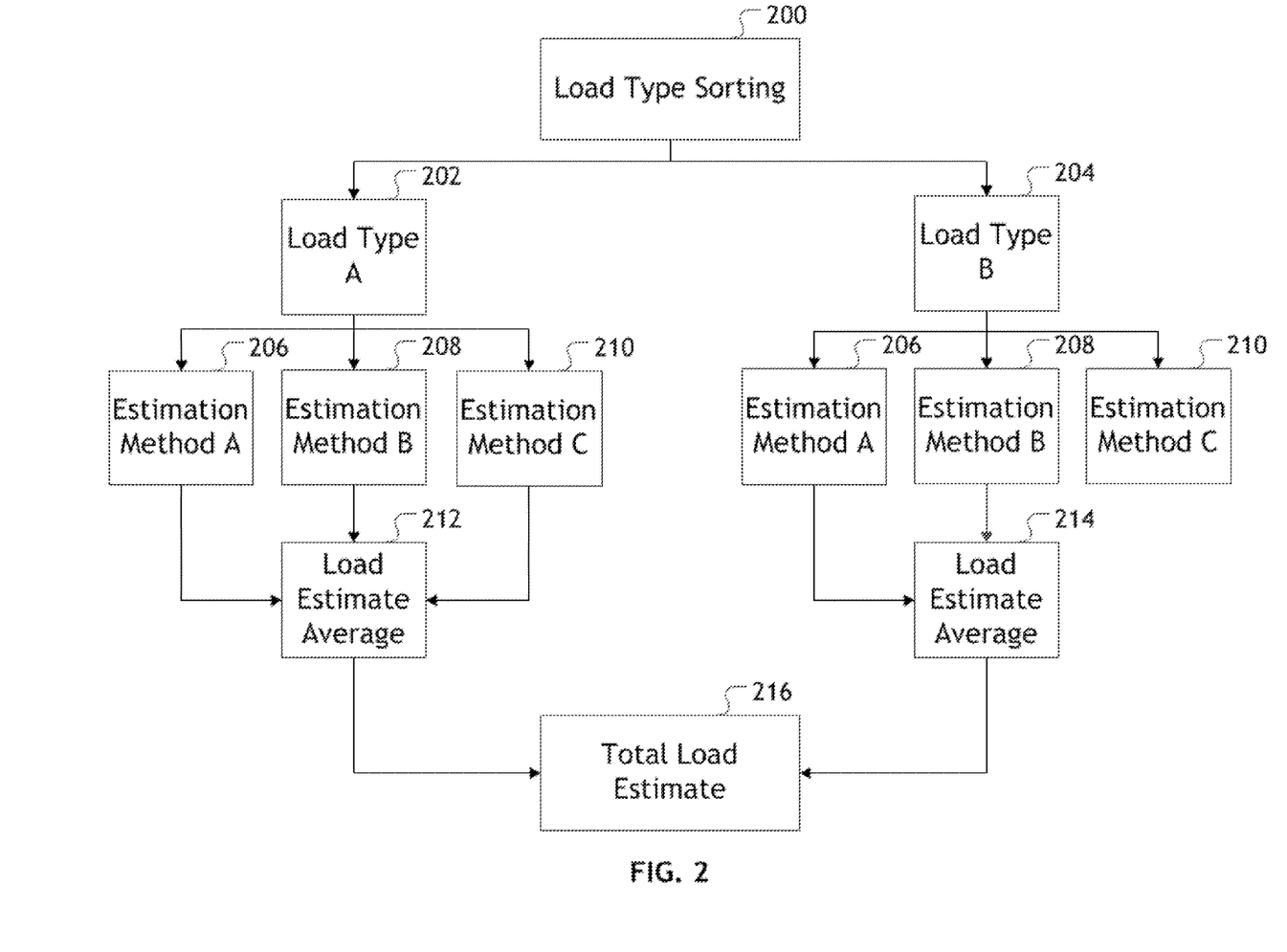
FIG. 2 is a flow chart depicting the general process by which the systems and methods may estimate forecasted load demanded by the microgrid.

Using the systems and methods of this application, the total load of the microgrid can be forecasted more accurately than standard BES forecasting methods would allow by using a grouping and averaging forecasting process. This process is shown in FIG. 2. This process may be performed on a microgrid coordinator located within the microgrid or located remotely. To begin, the microgrid's load demanding assets are be sorted into at least two different load-type categories in Load Type Sorting 200. These load-type categories are shown here as Load Type A and Load Type B, but in other embodiments there may be more load types. This sorting may be based on numerous different asset properties that are likely to affect the load forecast for those assets (e.g., whether the load demanded by the asset is dependent on outdoor temperature, time of day, day of the week, or others; whether the load consuming asset has a ramp-up and ramp-down rate, and others).

Once assets are sorted into Load Type A and Load Type B, multiple estimation methods may be used to estimate the forecasted load for that particular asset on the microgrid. These estimation methods are shown here as Estimation Method A, Estimation Method B, and Estimation Method C, but in other embodiments a different number of estimation methods may be used. The particular methods of estimation used are not critical to the systems and methods, but the Box-Jenkins Method, Winters-Taylor Method, and Kalman Filter Load Model are examples of potential estimation methods that could be used in this process.

Once all methods have estimated the forecasted load for the corresponding load type, the estimate results for each method are analyzed to identify inaccuracies. Method results may be analyzed, for example, to determine whether the results from one method are above a certain number of standard deviations above or below the mean value of the results of all methods combined. Method results may also be analyzed to determine whether they are significantly different from a historical or otherwise expected value. The results from methods that are shown to be inaccurate are discarded, and the remaining results are averaged. As depicted here, Load Estimate Average 212 is composed of all results from Estimation Methods 206-210, whereas Load Estimate Average 214 is composed of only results from Estimation Methods 206-208; results from Estimation Method 210 were rejected. Load Estimate Average 212 and Load Estimate Average 214 are then summed to determine Total Load Estimate 216. This accurate load forecast is useful for many microgrid operations, including but not limited to determining the microgrid's availability to participate in demand response events or generation optimization for the microgrid.

Figure 3:
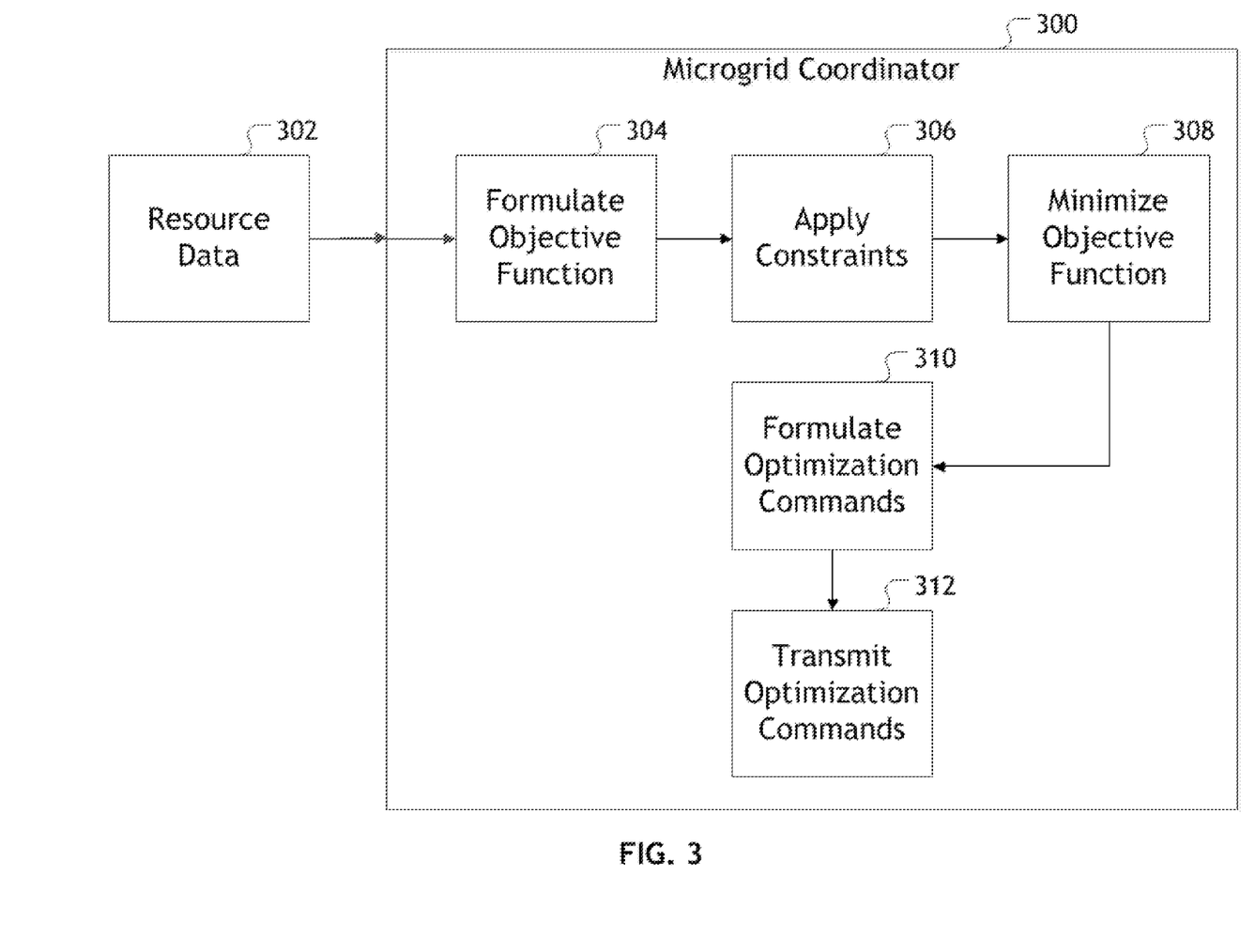
FIG. 3 is a flow chart depicting the general process by which the systems and methods may optimize electricity generation on the microgrid.

The systems and methods of this application utilize a microgrid optimization process to ensure that the microgrid is obtaining its load in the most economically advantageous fashion while conforming to microgrid constraints. A microgrid optimization process calculates, for any amount of microgrid load, the percentage of electricity to acquire from multiple electricity resources in order to serve that load most economically. FIG. 3 provides a general illustration of one embodiment of this this process as utilized by the systems and methods discussed herein. To begin, Microgrid Coordinator 300 obtains Resource Data 302. Resource Data 302 may include, but is not limited to, cost curves (e.g., price per kilowatt) for microgrid generators, microgrid storage devices, microgrid dispatchable load, and obtaining from the BES. Microgrid Coordinator 300 may obtain Resource Data 302 from multiple sources depending on data type. For example, cost curves for local generators may be acquired from said generators on the microgrid and real-time or forecasted costs of the fuel used by that generation. Cost curves for microgrid dispatchable load may be obtained from real-time load demand by microgrid assets or from microgrid load forecasts. Cost curves for obtaining electricity from the BES may be obtained from multiple outside sources with real-time or forecasted information on electricity prices in the geographic location of the microgrid.

In some embodiments, Resource Data 302 may incorporate a consideration of the opportunity cost of one or more potential resources. Including opportunity cost of resources enables the valuation of dispatchable load. The value of dispatchable load is beneficial when determining optimal microgrid function both in terms of responding to demand-response events and in terms of reducing the cost of operating the microgrid in general. There are several different components to consider when valuing dispatchable load. Efficiency cost, for example, includes factors such as the wear and tear that electrical equipment suffers when it is switched between one state and another over a long period of time. These costs may be negligible in residential and smaller commercial microgrids, but can add up in larger microgrids, especially those that participate in demand-response events quickly. Productivity cost, as opposed to efficiency cost, includes factors that tend to affect the microgrid owner's profit. For an owner of a microgrid running a commercial office building, for example, load may be dispatched by temporarily shutting down air conditioning units. As temperature in the office increases, employees in the office may get uncomfortable, causing their productivity to decrease. The effect that this productivity has on the microgrid owner's profits may greatly affect the valuation that dispatchable load.

These productivity costs may be determined by different factors in different situations. For example, if load were dispatched in the above commercial office building by shutting off non-critical software-development servers at a software company, the effects on long-term profit caused by not developing software on those servers for the time period they are shut off would affect the valuation of dispatching the corresponding load. In industrial setting, dispatchable load may power large equipment that takes a long time to cycle on once it is shut off, so a short-term load-shedding event may have longer effects on productivity for those machines. Further, if those machines are involved in a manufacturing process that cannot be completed by the start of the load-shedding event and cannot be stopped without forfeiting the progress made by that point, the microgrid owner may suffer lost product. This may be common, for example, in processes that are required to be performed at a constant temperature, such as preparing food and smelting metals. In residential settings, such as a microgrid containing a large apartment, dormitory, or condominium complex or even a house running a microgrid, valuation of dispatchable load may include the negative effect shedding that load has on the comfort of residents, rather than on the profit of the microgrid owner.

Once Resource Data 302 has been obtained, Microgrid Coordinator 300 Formulates the Optimization Function 304 in the form of a minimization objective function. The optimization function at this point takes into account Resource Data 302 and the target load amount to be provided by the function. The particular minimization function used is not material to this application. Once the optimization function is formulated, Microgrid Controller 300 Applies Constraints 306 to the objective function. Potential constraints include, but are not limited to, (1) generator availability, (2) generator maximum and minimum limits, (3) generator ramping rates, (4) minimum generation limit produced by the heating/cooling requirements of Combined Heat and Power (CHP) generating units needs for the microgrid for the CHP portion of the generation, (5) dispatchable load limits, (6) storage device availability, and (7) reserve requirements.

These constraints are used to eliminate potential objective-function solutions that fall outside what is feasible, possible, permitted, or preferred. For example, microgrid generator availability and ramping properties would foreclose solutions that would require more generation by microgrid resources than those resources could provide or that would not respect the ramping rates of microgrid generation resources. Dispatchable load maximum limits would foreclose solutions that would require more target load to be provided by dispatching microgrid resources than microgrid owners would prefer.

Once Microgrid Coordinator 300 Applies Constraints 306, it proceeds to Minimize the Objective Function 308. The minimized solution of the objective function is the operating plan to procure the target load. With the solution, MicroGrid Coordinator 300 Formulates Optimization Commands 310 to be transmitted to all assets involved in the optimized operating plan. These optimization commands could take the form of a command to a microgrid generator to ramp up or down generation, to a load asset to reduce consumption as part of load dispatch, to a storage device to release electricity to load assets, or to cut off a generator's or storage device's feed to a load asset, forcing the asset to source electricity from a different generator, a different storage device, or from the BES. Once these commands are available, Microgrid Coordinator 300 Transmits Optimization Commands 312 to all involved assets.

In addition to the benefits of coordinating microgrid activities in an economically optimal way, the systems and methods herein protect the microgrid from certain risks associated with being attached to the BES. For example, when variable generation resources (such as solar panels and wind turbines) are exposed to low-voltage situations, inverters within the variable generation resources may cease to operate. The systems and methods of the present disclosure protect these resources from low-voltage situations by equipping those resources with a protective device that enables them to operate while exposed to low voltage.

A further embodiment of microgrid protection provided by the systems and methods involves high levels of current. When microgrid load assets are exposed to unexpectedly high levels of current, they can be damaged, destroyed, and cause risk to operators of those assets. The systems and methods of this disclosure include over-current protection to protect microgrid load and generation assets from over-current faults, whether those overcurrents originate while the microgrid is connected to the BES or from internally while the microgrid is islanded (when isolated from the BES). However, over-current situations while connected to the BES and over-current situations present in the local islanded microgrid have different properties and different solutions. Additionally, a microgrid with a diverse and/or geographically disparate design can require different over-current protection settings depending on internal state conditions in the microgrid. Over-current situations while connected to the BES will involve higher fault current levels than over-current situations present in the local islanded microgrid. Thus, the microgrid coordinator must dynamically re-classify fault current levels and settings on-the-fly, pending real-time evaluation of the current state of the microgrid. Further, faults may require the microgrid coordinator to isolate all or some of the microgrid from the BES, or isolate components or feeders internal within the microgrid until the fault is cleared.

Figure 4:
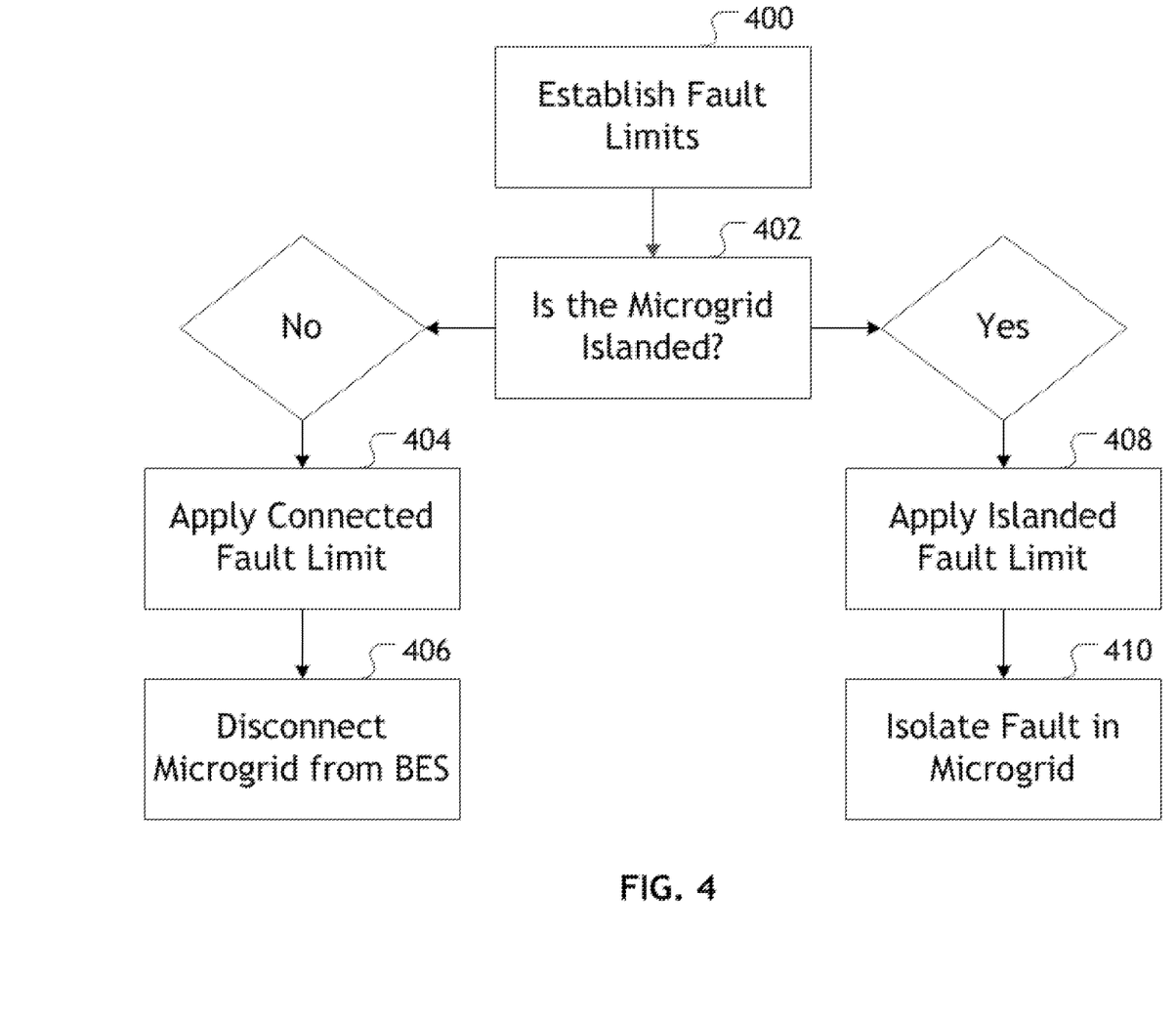
FIG. 4 is a flow chart depicting the general process by which the systems and methods protect against overcurrent faults.

Such an embodiment is illustrated in FIG. 4. Fault limits for both the islanded and BES-connected configurations are established in Step 400. If a fault is detected, the microgrid coordinator determines which fault limit to apply depending on whether the microgrid is islanded in Step 402. If the microgrid is not islanded, the BES-connected fault limit is applied in Step 404. If the fault is over the BES-connected fault limit, the microgrid is disconnected from the BES in Step 406. In this illustration only total microgrid disconnection is shown, but in some situations it may be possible to isolate only the faulting portion of the microgrid from the BES. If, on the other hand, the microgrid is islanded, the microgrid coordinator applies the islanded fault limit in Step 408. If the fault is over the islanded fault limit, the faulting portion of the microgrid is isolated from other portions of the microgrid in Step 410.

Figure 5:
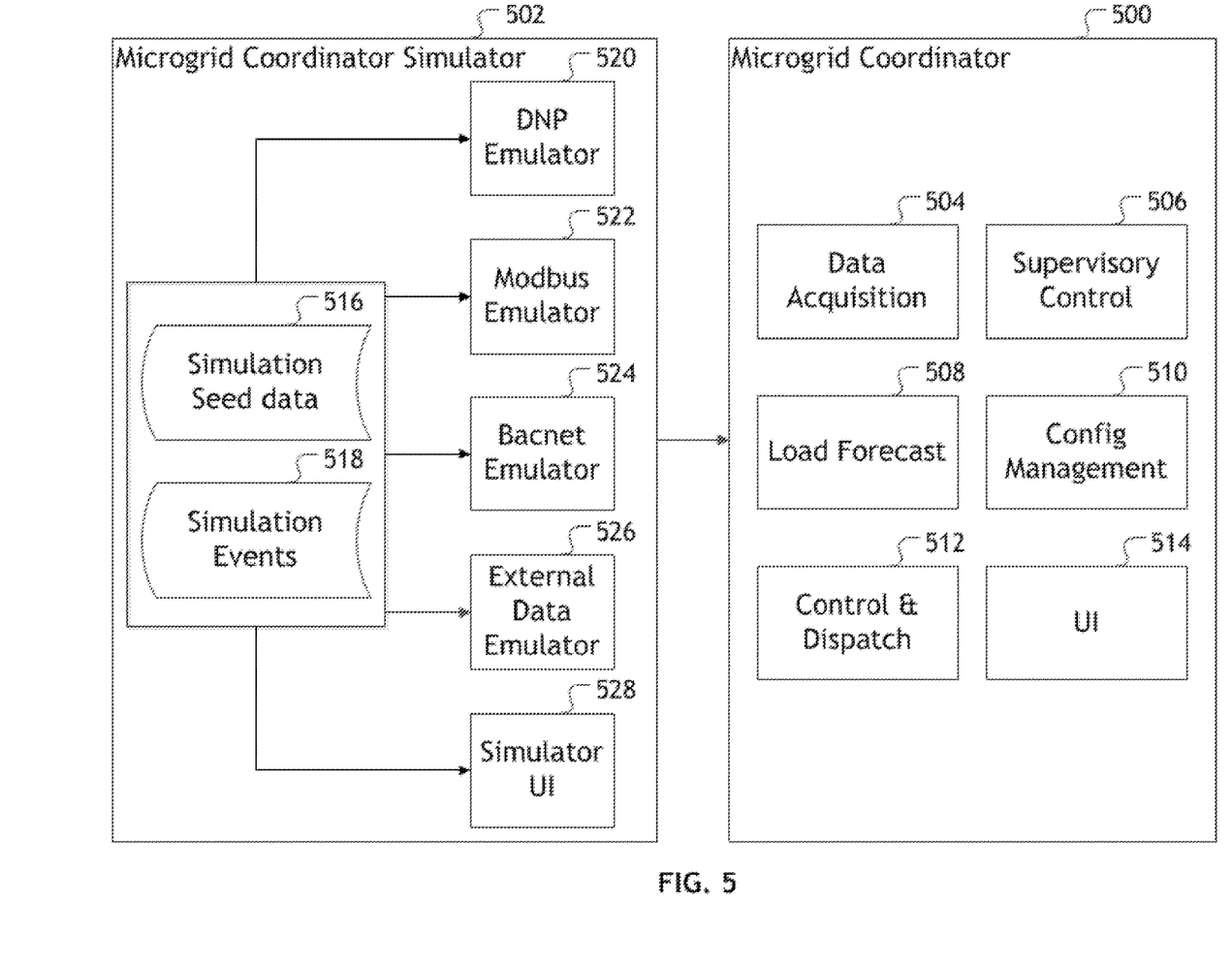
FIG. 5 is a diagram illustrating a potential implementation of a microgrid test simulator.

The systems and methods of the present disclosure include testing on a specially developed microgrid simulator in order to ensure that the systems and methods are safe to be implemented in the operating environment. The test system may simulate the key touch points of the microgrid coordinator, such as simulating data acquisition, supervisory control, and the microgrid to grid connection. In FIG. 5, Microgrid Coordinator 500 represents a final or prototype microgrid coordinator device that has not yet been implemented in a production operation environment, but is rather connected to Microgrid Coordinator Simulator 502. Within Microgrid Coordinator 500, 504-514 represent a nonexhaustive list of responsibilities Microgrid Coordinator 500 is expected to perform. In order to simulate proper Data Acquisition 504, Microgrid Coordinator Simulator 502 provides data to Microgrid Coordinator 500 in the same method operational assets would provide the same data in a production operation. Microgrid Coordinator Simulator 502 is presented with actual microgrid measurements that may be duplicated and slightly altered to provide a larger sample size. The result is Simulation Seed Data 516. Simulation Events 518 represent potential microgrid and BES events relating to these Simulation Seed Data 516, and are created through an import process or through a user-interface. These Simulation Seed Data 516 and Simulation Events 518 are communicated to Microgrid Coordinator 500 through the protocols recognized by Microgrid Coordinator 500. Thus, Microgrid Coordinator Simulator 502 may contain protocol emulators such as DNP Emulator 520, Modbus Emulator 522, Bacnet Emulator 524, and External Data Emulator 526. It is important to note that these protocols are illustrative only, and are not intended to be presented as an exhaustive list of all potential protocols that may be emulated by Microgrid Coordinator Simulator 502. In embodiments in which data, events, or commands are entered into Microgrid Coordinator Simulator 502 through a user interface, Microgrid Coordinator Simulator 502 may also contain Simulator UI 528. Simulator UI 528 may be used to configure simulation settings, add data, add or configure events, trigger communications with Microgrid Coordinator 500, and others. In this embodiment Simulator UI 528 is presented as separate from UI 514, but in some embodiments Microgrid Coordinator Simulator 502 and Microgrid Coordinator 500 may use the same interface or two different interfaces accessible by the same computer device. By sending Simulation Seed Data 516 and Simulation Events 518 to Microgrid Coordinator 500 through the requisite protocols, the ability of the Microgrid Coordinator to properly acquire data (Data Acquisition 504), control the microgrid (Supervisory Control 506), forecast load (Load Forecast 508), configure resource and asset characteristics (Config Management 510), and control assets during dispatching (Control & Dispatch 512). In embodiments in which Microgrid Coordinator 500 allows users to interact with the microgrid or Microgrid Coordinator 500 via a user interface, the user interface functionality (UI 514) could also be tested in this fashion.

The invention claimed is:

1. A method for managing the operation of a microgrid, said method comprising the steps of:
   a. Optimizing the forecast of load demanded by the microgrid, comprising:
      i. Categorizing load-demanding assets into at least two different load types, said load types being based on the functional characteristics of those load-demanding assets;
      ii. Using the functional characteristics and number of load-demanding assets belonging to each load-type to estimate the total load demanded for each load type;
      iii. Summing the estimated total load demanded for all load types;
   b. Ensuring the microgrid is obtaining said load demanded by the microgrid in the most economically optimal fashion, comprising:
      i. Identifying the load amount to be obtained;
      ii. Identifying properties of potential load resources for that load;
      iii. Formulaically determine the economically optimal amount of said load to be attributed to each load resource within applied constraints;
      iv. Distribute commands to microgrid assets to conform to the formulaically determined plan;
   c. Protecting microgrid load assets from over-current situations, comprising:
      i. Developing current-fault limits for grid-connected and isolated modes of operation;
      ii. Separating the faulting portion of the microgrid from the bulk electric system when in the grid-connected mode of operation and current over the grid-connected fault limit is detected;
      iii. Isolating the faulting portion of the microgrid when in the islanded mode of operation and current over the islanded fault limit is detected;
   wherein multiple estimation methods are employed to estimate the total load demanded for each load type;
   wherein estimation results of any single estimation method for any single load type are discarded if those estimation results deviate significantly from the mean of all the estimation results for that load type, and
   further comprising determining the mean of the non-discarded estimation results for each load type.

2. A system designed to manage the operation of a microgrid, said system comprising at least one microgrid coordinator device interfaced with at least one asset on a microgrid, said microgrid coordinator device designed to:
   a. Optimize the forecast of load demanded by the microgrid by:
      i. Categorizing load-demanding assets into at least two different load types, said load types being based on the functional characteristics of those load-demanding assets;
      ii. Using the functional characteristics and number of load-demanding assets belonging to each load-type to estimate the total load demanded for each load type;
      iii. Summing the estimated total load demanded for all load types;
   b. Ensure the microgrid is obtaining said load demanded by the microgrid in the most economically optimal fashion by:
      i. Identifying the load amount to be obtained;
      ii. Identifying properties of potential load resources for that load;
      iii. Formulaically determine the economically optimal amount of said load to be attributed to each load resource within applied constraints;
      iv. Distribute commands to microgrid assets to conform to the
      v. formulaically determined plan;
   c. Protect microgrid load assets from over-current situations by:
      i. Developing current-fault limits for grid-connected and isolated modes of operation;
      ii. Separating the faulting portion of the microgrid from the bulk electric system when in the grid-connected mode of operation and current over the grid-connected fault limit is detected; and
      iii. Isolating the faulting portion of the microgrid when in the islanded mode of operation and current over the islanded fault limit is detected;
   wherein multiple estimation methods are employed to estimate the total load demanded for each load type;
   wherein estimation results of any single estimation method for any single load type are discarded if those estimation results deviate significantly from the mean of all the estimation results for that load type, and
   further comprising determining the mean of the non-discarded estimation results for each load type.

* * * * *